(12) United States Patent
Higa et al.

(10) Patent No.: US 8,279,551 B2
(45) Date of Patent: Oct. 2, 2012

(54) HEAD POSITIONING METHOD FOR ECCENTRIC TRACK AND HEAD POSITIONING CONTROL DEVICE

(75) Inventors: Kunihito Higa, Kodama-gun (JP); Yoshihiro Sakurai, Kodama-gun (JP); Yukio Yamamoto, Kokubunji (JP)

(73) Assignee: Hitachi High-Technologies Corporation, Tokyo (JP)

( * ) Notice: Subject to any disclaimer, the term of this patent is extended or adjusted under 35 U.S.C. 154(b) by 12 days.

(21) Appl. No.: 12/709,847

(22) Filed: Feb. 22, 2010

(65) Prior Publication Data

US 2010/0214686 A1  Aug. 26, 2010

(30) Foreign Application Priority Data

Feb. 23, 2009 (JP) .................................. 2009-039368

(51) Int. Cl.
*G11B 5/596* (2006.01)
(52) U.S. Cl. .................................................... 360/77.04
(58) Field of Classification Search .................. None
See application file for complete search history.

(56) References Cited

U.S. PATENT DOCUMENTS

| | | | | |
|---|---|---|---|---|
| 5,608,586 A | * | 3/1997 | Sri-Jayantha et al. | 360/77.04 |
| 5,920,441 A | * | 7/1999 | Cunningham et al. | 360/78.05 |
| 5,995,316 A | * | 11/1999 | Stich | 360/77.04 |
| 6,493,175 B1 | * | 12/2002 | Carlson | 360/77.04 |
| 6,493,177 B1 | * | 12/2002 | Ell et al. | 360/78.05 |
| 6,496,322 B1 | * | 12/2002 | Hasegawa et al. | 360/77.08 |
| 6,532,129 B1 | * | 3/2003 | Sri-Jayantha et al. | 360/77.02 |
| 6,747,836 B2 | * | 6/2004 | Stevens et al. | 360/78.05 |
| 6,952,320 B1 | * | 10/2005 | Pollock et al. | 360/77.04 |
| 7,035,041 B1 | * | 4/2006 | Guo et al. | 360/78.05 |
| 7,215,501 B2 | * | 5/2007 | Shigematsu | 360/77.04 |
| 7,280,304 B2 | * | 10/2007 | Wu | 360/75 |
| 7,333,288 B2 | * | 2/2008 | Kim et al. | 360/77.04 |
| 2009/0268326 A1 | * | 10/2009 | Shelor | 360/31 |
| 2010/0079900 A1 | * | 4/2010 | Nakamura et al. | 360/75 |

FOREIGN PATENT DOCUMENTS

| | | |
|---|---|---|
| JP | 2007-12119 A | 1/2007 |
| JP | 2007-149155 A | 6/2007 |

\* cited by examiner

*Primary Examiner* — Hoa T Nguyen
*Assistant Examiner* — James L Habermehl
(74) *Attorney, Agent, or Firm* — Mattingly & Malur, PC (57) ABSTRACT

Drive waveforms with which extension and contraction characteristics of an actuator corresponding to a number of track eccentricity amounts are stored as data. By reading servo information written in a disk is obtained as a signal indicating a head displacement amount from a track. The head is moved in a direction in which the track is displaced by obtaining an amplitude corresponding to a slip amount of the head position and a rotation angle of maximum eccentricity, reading drive waveforms which is optimal in driving the actuator from the memory and driving the actuator with a drive waveform matched with the rotation angle at which the eccentricity is maximum.

13 Claims, 4 Drawing Sheets

DISPLACEMENT
WAVEFORM

FIG. 3(b)

DRIVE WAVE FORM
OF EXTENSION
AND CONTRACTION
OF PIEZO
ACUTUATOR

FIG. 6

HEAD POSITIONING METHOD FOR ECCENTRIC TRACK AND HEAD POSITIONING CONTROL DEVICE

TECHNICAL FIELD

This invention relates to a head positioning method for eccentric track and a head positioning control device. In detail, in a case where a head is dynamically positioned in a rotating aimed track under ON track servo control by utilizing servo information set in a high density recording medium such as a discrete track medium (DTM), this invention relates to a head positioning method for positioning the head in an eccentric track highly precisely with respect to the rotating aimed track in a case where the track is eccentric and the servo information is eccentric without position correction of a spindle of a disk rotation center corresponding to eccentricity of the track.

BACKGROUND ART

The hard disk drive (HDD) for a disk of 3.5 to 1.8 inches or even 1.0 inch or less has been used in various fields of automobile products, home electrical appliances and audio appliances, etc. Therefore, the reduction of cost of hard disk drive and the mass production thereof have been requested and the large memory capacity thereof has been also requested.

In order to satisfy these requests, there is a tendency that the high density recording magnetic disk medium of the vertical magnetic memory system, which has lately been put to practical use, has been employed in the above mentioned fields and spread rapidly.

The magnetic disk medium of the vertical magnetic memory system is used in a composite magnetic head (hereinafter referred to as a head) having a TMR (tunnel magneto-resistance) head or a GMR (giant magneto-resistance) head, which is a memory medium separable from the head by 10 nanometer or less controllably.

Such magnetic medium generally includes a glass substrate, a soft magnetic layer formed on the glass substrate and a magnetic layer provided on the soft magnetic layer. Discrete tracks are formed in a discrete substrate by etching the magnetic layer. (Incidentally, the term "disk substrate" is used as a material of magnetic disk to be mounted on a hard disk drive.)

The etching for forming grooves between tracks is formed through an uneven photo-resist film. The unevenness of the photo-resist film is formed by using the nano-print lithography and pushing the photo-resist film with an uneven stamper. The track width of the discrete track formed by the dry etching through the uneven photo-resist is 100 nm or less and the groove separating adjacent tracks is filled with a non-magnetic material in a later step. The technique of this kind is described in JP-2007-012119A and JP-2007-149155A, etc., and well known.

The magnetic disk of this kind is called as a magnetic recording medium of the discrete track system (DTM) and is currently paid attention to a technique capable of realizing ultra high density recording exceeding 1 terabit (inch$^2$) for 2.5 inches several years later. Further, the bit patterned medium (BPM) having discrete tracks, which are finely separated magnetically in the track direction, has been entered into the practical implementation step recently.

In a usual DTM, a center of the DTM is eccentric with respect to a rotation center of a spindle and a center of discrete tracks formed in the DTM are eccentric with respect to the center of the DTM. Therefore, the tracks formed in the disk become eccentric with respect to the rotation center of the spindle unless the eccentricity is corrected stepwise.

Therefore, the head accessing tracks of the DTM can not trace tracks unless the ON track servo control is performed according to servo information. Since the servo information itself is provided correspondingly to respective sectors, the position of the servo information becomes eccentric when the tracks are eccentric. When the eccentricity of the track becomes large, the ON track servo control becomes indefinite and, therefore, the ON track control and the highly precise head positioning with respect to the aimed track, which is performed before the ON track servo control is started become impossible.

Therefore, it is necessary to perform a mounting position correction of a disk with respect to the spindle, in order to match the rotation center of the tracks with the rotation center of the disk (rotation center of the spindle). In an example of the track eccentricity correcting mechanism, a disk rotation center is matched with a track rotation center by moving a mounting position of a disk with respect to a spindle. However, the size of the disk rotating mechanism is large and, in order to set the amount of eccentricity to a predetermined value, it is necessary to perform the position correction of the disk several times.

SUMMARY OF THE INVENTION

An object of this invention is to provide a head positioning method for eccentric tracks, which is capable of positioning a head in an eccentrically rotating aimed track with highly precisely without performing preliminary position correction of a disk rotation center with respect to a spindle according to eccentricity of the track.

Another object of this invention is to provide a head positioning control device for an eccentric track, which is possible to position a head with highly precisely to an aimed track without providing an eccentricity correction mechanism.

In order to achieve the objects, a first invention which is the head positioning method using the head positioning control device which includes a disk having a number of tracks in which servo information are set, a rough moving stage, a fine moving stage mounted on the rough moving stage, a head mounted on the fine moving stage and an actuator for moving the head in a radial direction of the disk at high speed in order to position the head in an eccentrically rotating designated track, comprises the steps of storing a number of drive waveforms for obtaining extension and contraction characteristics of the actuator corresponding to each of amounts of eccentricity of a track in one revolution of the disk as data in a memory, obtaining a position detection signal of the head during one revolution of the disk as a signal indicating head displacement amount from a designated track, and obtaining an amplitude corresponding to a slip amount of the head position and a rotation angle of a maximum eccentricity on the basis of the position detection signal, wherein the head is moved in a displacement direction of the designated track by driving the actuator by reading a drive waveform which is optimum for amplitude from the memory and generating a drive waveform matched with a rotation angle having a maximum eccentricity.

A second invention comprises the steps of positioning a head in a designated track by moving a fine moving stage in a state in which a movement of the head by the actuator is fixed, receiving a read signal of servo information from the head corresponding to a designated read start signal and generating a position detection signal of the head for one track revolution corresponding to a position slip of an eccentrically rotating designated track, detecting an amplitude of the position detection signal for one track revolution and a rotation angle from a designated read start signal position to a maximum peak position in the position detection signal, and obtaining an actuator drive signal having a maximum extension and contraction amount corresponding to a maximum position slip indicated by the amplitude of the position detection signal from a memory storing the drive signals of the actuator as extension and contraction data of the actuator corresponding to track eccentricity amounts, wherein the head is positioned in a designated track in such a way that the head follows in an eccentric direction of a designated track by driving the actuator by an actuator drive signal obtained by the generation of a designated read start signal as a reference of the position corresponding to the generation timing of a designated read start signal determined by the rotation angle of the obtained actuator drive signal or a signal having waveform which is an inversion of the waveform of the drive signal.

In this invention, the drive waveforms for obtaining the extension and contraction of the actuator corresponding to the track eccentricity amounts are stored in a memory (for example, a memory table by tabling the drive waveforms) as data. On the other hand, servo information written in a disk is read out and the head position detection signal is obtained as a signal indicating the head displacement amount from the track. The amplitude corresponding to the slip amount of the head position and the maximum eccentric rotation angle are obtained from the position detection signal, an optimal drive waveform in driving the actuator is read out from the memory and the head is moved in the direction of the displacement of the track by driving the actuator with using the drive waveform including the maximum eccentric rotation angle.

The eccentricity amounts of the respective tracks with respect to the rotation center of the disk, for example, a DTM, is determined by a slip amount between the track center and the disk rotation center. The slip amount (displacement) of the head with respect to the track position accessed by the head is changed correspondingly to the rotation angle of the disk. However, the rotation angle of the disk, in which the eccentricity of any track is maximal, is obtained when the head is positioned in a track position on a linear line extending from the track center to the rotation center of the disk. In such case, the rotation center of the disk coincides with the rotation center of the spindle.

The head displacement (position slip) with respect to the track position when eccentricity is maximum occurs twice for one revolution, that is, the track eccentricity (positive side track eccentricity) when the track moves forward with respective to the head and the track eccentricity (negative side track eccentricity) when the track moves rearward with respective to the head. The position slip amounts of the head in these locations are substantially the same. Therefore, the eccentricity waveform in the track position with respect to the head position becomes similar to a sine waveform. Incidentally, eccentricity directions of the track and the displacement (position slip) of the head are mutually opposite. Therefore, the position slip on the head side due to the track eccentricity becomes opposite to the above case.

On the other hand, when the actuator is a piezo actuator, the extension and contraction characteristics of the piezo actuator in the hysteresis characteristics thereof becomes a waveform characteristic similar to a sine waveform. Therefore, when the piezo actuator is driven by a waveform similar to a sine waveform along one hysteresis loop for one track revolution, it is possible to make the extension and contraction characteristics of the piezo actuator equivalent to the head position slip amount (displacement amount from the track) in an arbitrary track position.

Therefore, when the piezo actuator is driven such that the extension and contraction of the actuator becomes opposite to the direction of the track slip amount of the head, the head can trace this track following the eccentric track even when the track is eccentric with respect to the rotation center of the DTM (disk).

The rotation angle with which the eccentricity of the track using the read start signal as a reference becomes maximal is determined by a direction on a linear line connecting the track center and the rotation center of the disk. Therefore, it is possible to make the drive waveform of the piezo actuator equivalent to the eccentricity (position slip of the head from the track) of the track by detecting a rotation angle with which the eccentricity becomes maximal.

Incidentally, when the actuator is driven by the waveform similar to a sine waveform in the head positioning, any actuator may be used.

It is, of course, possible to drive the head in such trace control through any actuator together with the ON track servo control or such head drive may be done with a servo control which is not ON track servo control.

As a result, it is unnecessary to preliminarily correct the position with respect to the spindle which is the rotation center of the disk corresponding to the eccentricity of the track. Further, the head can read/write in a designated track when the track is eccentric with respect to the rotation center of the disk and the head positioning in the eccentric track becomes easy.

DESCRIPTION OF THE PREFERRED EMBODIMENT

Figure 1:
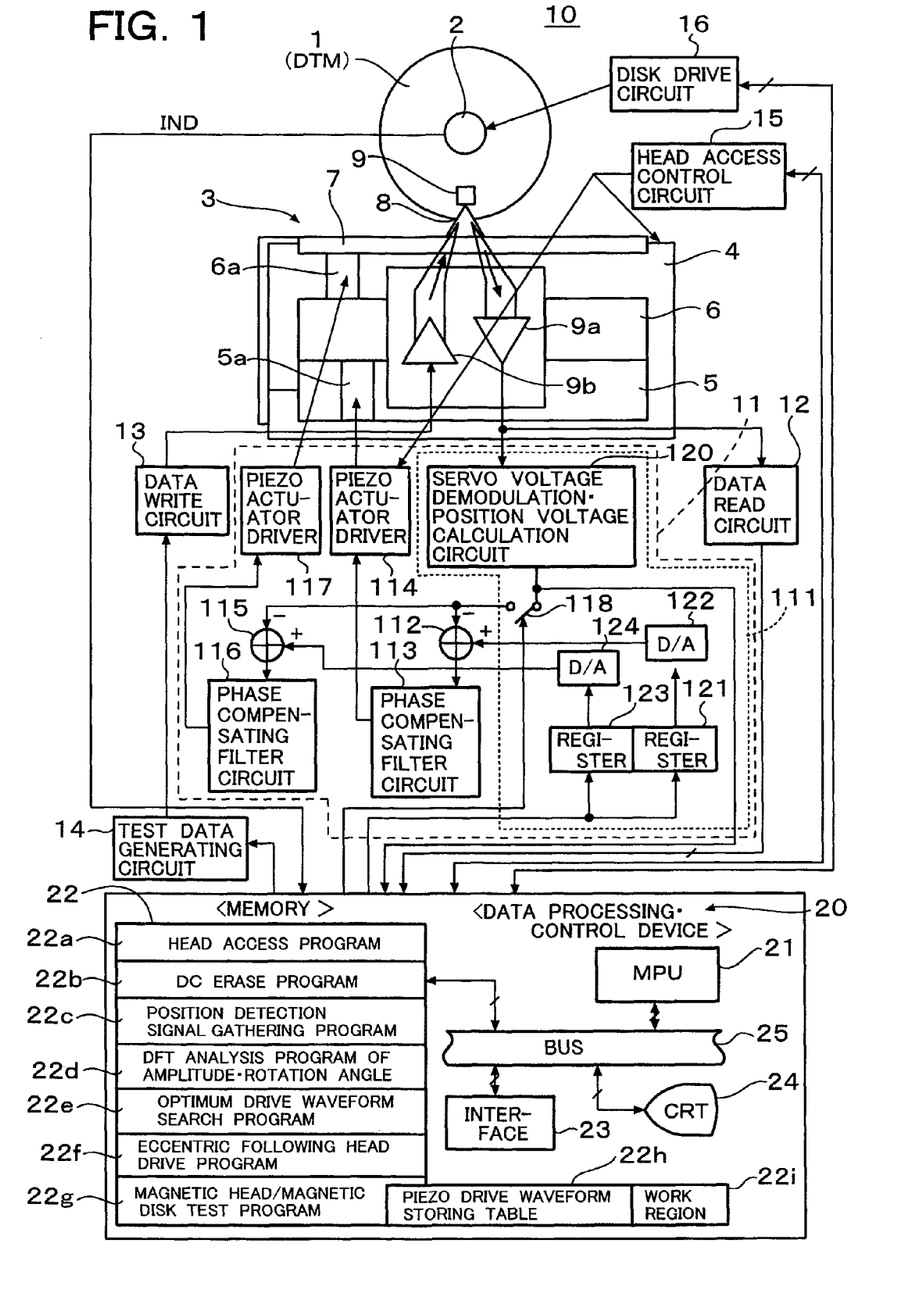
FIG. 1 shows a block diagram of a magnetic head/magnetic disk test device according to an embodiment of this invention.

In FIG. 1, a reference numeral 10 depicts a test device for a magnetic head/magnetic disk which is an example of the head positioning control device of this invention.

A DTM (discrete track medium) 1 is detachably mounted on a spindle 2. A head carriage 3 is provided adjacent to the spindle 2. The head carriage 3 is constructed with a rough stage 4 and a fine piezo stage 5.

On the piezo stage 5, a composite magnetic head 9 (hereinafter referred to as a head) having an MR head (read head) and a thin film inductive head (writ head) is mounted.

The rough stage 4 is an XY stage including an X stage and a Y stage. The X stage of the rough stage 4 is movable in radial direction of the DTM 1 and moves the piezo stage 5 in radial direction of the DTM 1 through the Y stage. The Y stage of the rough stage 4 is mounted on the X stage and performs a movement with respect to the head 9 for a position regulation in Y direction. The piezo stage 5 is mounted on the Y stage. The piezo stage finely regulates the position of the head 9 in the X direction. Incidentally, the X direction conforms to the radial direction passing through the center of the DTM 1.

On the piezo stage 5, a cartridge mounting base 6 and a piezo actuator 5*a* for moving the cartridge mounting base 6 in X direction with using the piezo stage 5 as a reference, etc. On the cartridge mounting base 6, a piezo actuator 6*a* is provided and a head cartridge 7 is provided through the piezo actuator 6*a*. The piezo actuator 6*a* moves the head cartridge 7 in X direction with using the cartridge mounting base 6 as a reference.

The head 9 is supported by the head cartridge 7 through a suspension spring 8 and is mounted in a top end side of the suspension spring 8.

The head 9 is moved in radial direction along an X axis of the DTM 1, seeks the tracks of the DTM 1 and is positioned in one of the tracks. The head 9 performs a so-called head access operation including data reading from or data writing to the track.

The head cartridge 7 detachably mounts the head 9 on the head carriage 3. On the cartridge mounting base 6, a read amplifier 9*a* connected to an MR head of the head 9 and a write amplifier 9*b* connected to an inductive head (write head), etc., are provided.

The read amplifier 9*a* amplifies a read signal from the MR head and sends it to a servo positioning control circuit 11 and a data read circuit 12. The read signal is inputted to the data processing•control device 20 through the data read circuit 12.

The write amplifier 9*b* is connected to a data write circuit 13 and the inductive head is driven by a test data from the data write circuit 13.

The data read circuit 12 receives the read signal from the read amplifier 9*a*, binary-codes the read signal (data signal) to form a waveform and sends it to the data processing•control device 20. A reference numeral 15 depicts a head access control circuit. The head access control circuit 15 receives the control signal from the data processing•control device 20, drives the piezo stage 5 through the rough stage 4 and a piezo actuator driver 114 and positions the head 9 in a predetermined track as an aimed track.

The data write circuit 13 receives a predetermined test data from the test data generating circuit 14, generates a write signal according to the test data, drives the write amplifier 9*b* and writes the data in the predetermined track through the inductive head of the head 9. The test data generating circuit 14 generates a predetermined test data under control of the data processing•control device 20.

Incidentally, a reference 16 depicts a disk drive circuit.

The servo positioning control circuit 11 includes an aimed position voltage generator circuit 111, an error voltage generator circuit 112 driving the piezo actuator 5*a*, a phase compensating filter circuit 113 for driving the piezo actuator 5*a*, a piezo actuator driver 114 for driving the piezo actuator 5*a*, an error voltage generator circuit 115 for driving the cartridge, a phase compensating filter circuit 116 for driving the piezo actuator 6*a*, a piezo actuator driver 117 for driving the piezo actuator 6*a* and a switch circuit 118.

The aimed position voltage generator circuit 111 includes a servo voltage demodulation•position voltage calculation circuit 120, a register 121 and a D/A converting circuit (D/A) 122 on the side of the piezo actuator 5*a* and a register 123 and a D/A converting circuit (D/A) 124 on the side of the piezo actuator 6*a* and the aimed value data from the data processing•control device 20 is set in the registers 121 and 123.

The aimed value data set in the registers 121 and 123 are converted to analog converted voltage values corresponding to the aimed tracks by the D/A 122 and the D/A 124. The respective analog converted voltage values (aimed position voltage values) are supplied from the aimed position voltage generating circuit 111 to the error voltage generating circuits 112 and 115.

The switching circuit 118 is ON/OFF operated by a switching signal from the processing•control device 20. When the switching circuit 118 is ON, the switching circuit 118 sends a position detection signal PV from the servo voltage demodulation•position voltage calculation circuit 120 to the error voltage generator circuits 112 and 115. The position detection signal PV is sent from the servo voltage demodulation•position voltage calculation circuit 120 to the data processing•control device 20.

As a result, when the switching circuit 118 is ON, the voltage of the servo information read by the read head of the head 9 is sent to the error voltage generator circuits 112 and 115 and the position of the head 9 with respect to the positioning track is dynamically controlled. That is, it becomes the so-called ON track servo control.

On the other hand, when the switching circuit 118 is OFF, the position detection signal PV is not inputted to the error voltage generator circuits 112 and 115. The input signals of the error voltage generator circuits 112 and 115 receive the aimed position voltage value outputted from the data processing•control device 20 through the registers 121, 123, D/A 122 or D/A 124.

Incidentally, the read signal from the read amplifier 9*a* is inputted to the servo voltage demodulation•position voltage calculation circuit 120 and the position detection signal PV is generated from the servo voltage demodulation•position voltage calculation circuit 120 on the basis of the servo information among them.

For the sake of the drawing of FIG. 1, the piezo actuator 6*a* is provided on the cartridge mounting base 6 and the top end portion thereof is coupled to the head cartridge 7 whose weight is small. However, it is possible to provide the piezo actuator 6*a* within the head cartridge 7 and couple the top end portion thereof to a head assembly (suspension spring 8) within the head cartridge 7.

The piezo actuators 5*a* and 6*a* are controlled by the servo positioning control circuit 11 perform the ON track servo positioning in which the head 9 is put on a track by finely regulating the head position according to the servo signal (servo information) read from the track.

In the aimed position voltage generator circuit 111, the aimed value data from the data processing•control device 20 is set in the registers 121 and 123. One of the aimed value data is a data obtained from the drive waveform of the piezo actuator 6*a*. The aimed track data is converted to an analog voltage value by the D/A 122 and the D/A 124. When the aimed value data is analog-converted by the D/A 122 and D/A 124 and inputted to the error voltage generator circuits 112 and 115 as voltage values corresponding to the aimed track, the head 9 is moved toward the aimed position (a center of the aimed track).

The fine positioning of the head 9 to the aimed track can be done by the head access control circuit 15 through the piezo actuator 5*a*.

In the aimed position voltage generator circuit 111, the expansion and contraction drive of the piezo actuator 5*a* is fixed when the switching circuit 118 is OFF and the aimed position voltage value outputted to the error voltage generator circuit 112 through the D/A 122 is constant. Therefore, the piezo stage 5 can position the head 9 in a designated aimed track or a designated aimed position within the own movable range (drive range of the piezo actuator 5a) on condition that the control of the piezo actuator 5a in the side of the head access control circuit is not performed.

Similarly, when the switching circuit 118 is OFF and the aimed position voltage value outputted to the error voltage generator circuit 115 through the D/A 124 is constant, the expansion and contraction drive of the piezo actuator 5a becomes fixed. Therefore, the piezo actuator 6a can position the head 9 in a designated aimed track or a designated aimed position within the own movable range.

That is, the head 9 can be moved to an arbitrary position within the movable range in X direction by fixing the head 9 in a designated position in the movable range of either one of the piezo actuator 5a and the piezo actuator 6a and the other piezo actuator is driven by a designated drive waveform.

Incidentally, it is preferable that the fixed position of the head 9 in the movable range of either one of the piezo actuator 5a and the piezo actuator 6a is set in a position in which the head can be moved front and rear within an eccentric range of the track in moving the head 9 by driving the piezo actuator 6a. This is because it is possible to obtain a position detection signal 26, which is to be described later, as a more proper signal.

The servo voltage demodulation•position voltage calculation circuit 120 is constructed with a DSP (digital signal processor) and generates a position voltage corresponding to the track position from the servo information (servo burst signal) read out from the read amplifier 9a.

For example, it is assumed that ten tracks in which the head is positioned is counted as a unit and seven servo pattern signals (servo burst signals) A to J are recorded corresponding to track 0 to track 10 in such a way that the signals A to J have a designated frequency, are lagged in circular direction by a designated interval D (for example, 1 µsec), have a width contacting to centers of front and rear tracks and half widths overlapped on the front and rear tracks.

In such case, it is possible to obtain the position detection voltage PV showing a position of the head with respect to the track by obtaining the amplitude levels of the servo burst signals as voltage values Vi (i=a~j) for the servo burst signals in the track positions obtained from the read amplifier 9a with using a detection voltage signal in the position of track 0 as a reference and calculate by using the equation, for example, $$PV=\{(Va-Vj)+0.75*(Vb-Vh)+(0.5*(Vc-Vg)+0.25*(Vd-Vf)\}/(Va+Vb+Vc+Vd+Ve+Vf+Vg+Vh+Vi+Vj)$$

That is, the position detection voltage PV is obtained by inputting the read signal from the read amplifier 9a in the servo voltage demodulation•position voltage calculation circuit 120 of the DSP and substituting amplitude levels of the respective read signals in the above equation. Further, by normalizing the voltage PV to normalized voltage from −1V to +1V, it is possible to obtain a normalized POS voltage (position detection signal) corresponding to the respective track position having a center linear inclination as shown in FIG. 2.

Incidentally, the ordinate shows the normalized POS voltage and the abscissa is the track number.

Figure 2:
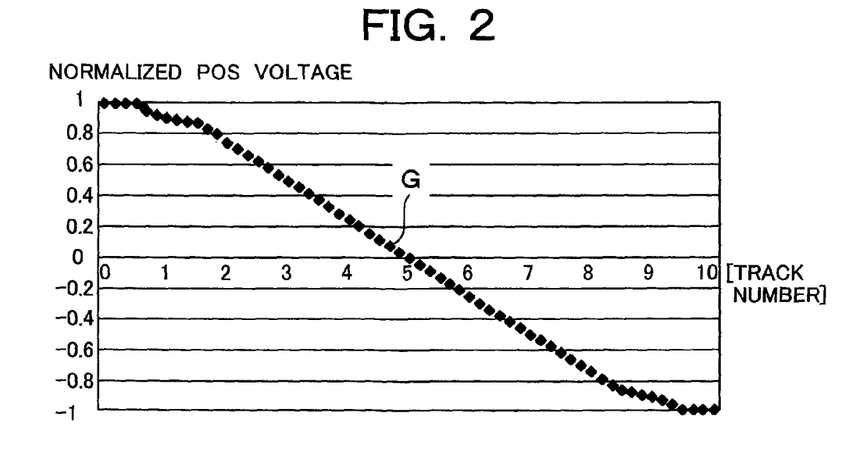
FIG. 2 shows a normalized position detection signal.

It is usual that, according to the characteristics graph G shown in FIG. 2, the highly precise fine positioning for front 5 tracks and rear 5 tracks from the position which is roughly positioned in the X stage is performed by driving the piezo actuator 5a of the piezo stage 5 and the piezo actuator 6a for moving the head cartridge 7 by the servo positioning control circuit 11.

Incidentally, in FIG. 2, the relation between the head access direction (track number/abscissa) of the track and the voltage value (normalized POS voltage/the ordinate axis) of the position detection signal is an example, there is a case where the plus side and minus side of the position detection signal (normalized POS voltage/ordinate axis) with respect to the track number (abscissa) are inverted.

Figures 3A, 3B:
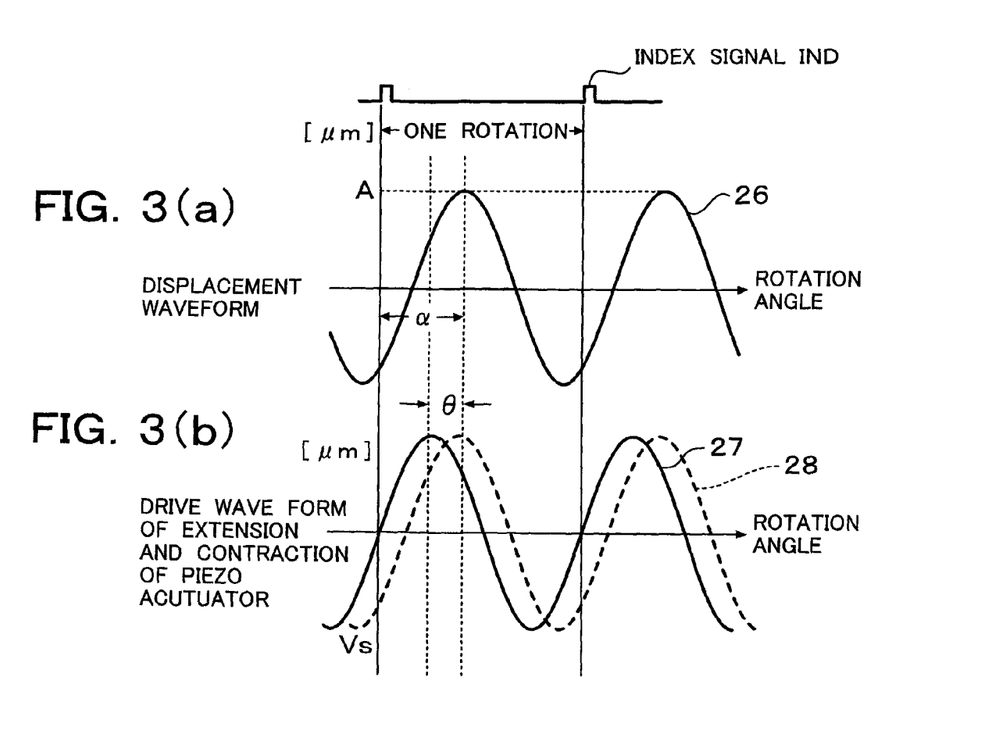
FIG. 3(a) shows a waveform of a position detection signal obtained in a movement of a magnetic head due to track eccentricity and FIG. 3(b) shows a drive waveform of a piezo actuator.

The above description is in a case where the aimed track is not eccentric with respect to the positioning of the head 9 to the aimed track. In this case, however, the aimed track is eccentric. Therefore, when the servo burst signal written in the servo region of the DTM 1 is read by the head 9 through the read amplifier 9a, the position detection signal 26 corresponding to a position lag (displacement) of the head 9 from the aimed track corresponding to a moving locus of the head 9 due to the track eccentricity is obtained with respect to the position detection signal shown in FIG. 2 which is obtained from the servo voltage demodulation•position voltage calculation circuit 20, as shown in FIG. 3(a). The ordinate of the position detection signal 26 is the amount of displacement and the abscissa is a rotation angle of the disk on the basis of the index signal IND (read start signal). The index signal IND is a synchronizing signal which is a rotation standard from an encoder provided in the spindle 2 and is inputted to the data processing•control device 20.

Incidentally, in lieu of the index signal IND, a start sector signal (synchronizing signal) for one rotation may be used. In FIG. 3(a), the ordinate is the amount of displacement, which is calculated by multiplying the amplitude of the position detection signal 26 by the width of the track from the relation shown in FIG. 2. Therefore, opposition detection signal 26 can be taken as a displacement waveform with respect to the positioning track (aimed track).

As shown in FIG. 2, the abscissa of the normalized position detection signal PV is track number, the abscissa becomes the moving distance of the head when the abscissa is multiplied by the track width. Therefore, the amount of displacement from the aimed track can easily be calculated from the position detection signal PV in the data processing•control device 20. In such case, it is possible to obtain the amount of displacement by inputting the position detection voltage PV obtained from the above mentioned equation without normalization to the data processing•control device 20. Since the position detection voltage PV is not normalized in the range from −1V to +1V, the waveform itself becomes similar to the waveform of the position detection signal 26. Therefore, the position detection voltage 26 including the signal of the position detection voltage PV and the position detection signal PV will be described regardless of normalizing or non-normalizing.

The displacement waveform of the position detection signal 26 is similar to a sine waveform. The ordinate is the amount of displacement [µm].

As shown in FIG. 2, when the head 9 goes back from the aimed track, the amount of displacement of the position detection signal 26 becomes + side voltage value and, when the head 9 goes forward, the displacement becomes − side voltage value.

Figure 5:
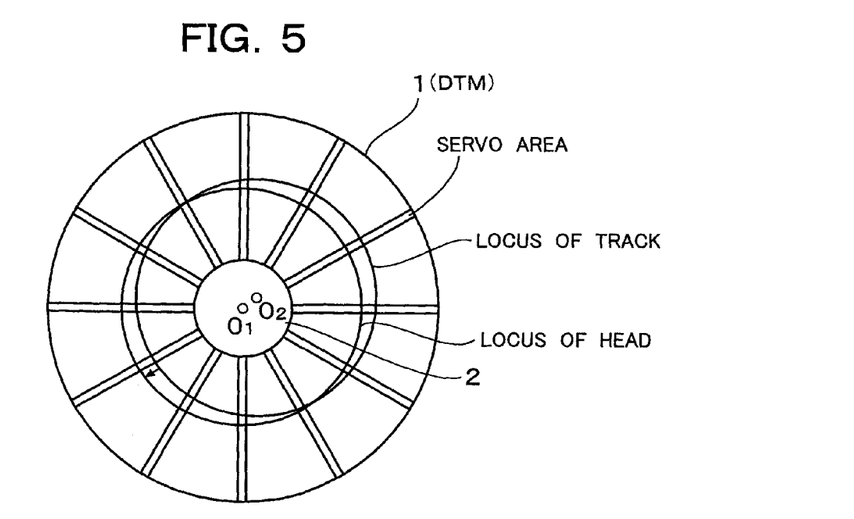
FIG. 5 shows a disk rotation center and a deviation of position of a track due to track eccentricity.

As shown in FIG. 5, the track becomes eccentric since there is a position lag between a rotation center O1 (rotation center of the disk) of the spindle 2 on which the DTM 1 is mounted and a center O2 of each track. Therefore, when the DTM 1 rotates once in a track in which the head 9 is positioned, a positional slip occurs due to a track eccentricity of several tracks in front and rear directions. On the other hand, the theoretical locus of the head 9 positioned in an aimed track becomes a circle having a center in the rotation center O1 of the spindle 2. Therefore, the head displacement waveform (positional slip of the head) due to the position detection signal 26 shown in FIG. 3(*a*) can be obtained.

As clear from FIG. 5, the direction of eccentricity of the track is opposite to the displacement (positional slip direction) of the head.

Therefore, the amount of positional slip (amount of displacement) of the head 9 from the aimed track (positioning track) corresponding to the rotation of the DTM 1 due to track eccentricity can be detected in the data processing•control device 20 by obtaining the waveform of the position detection signal 26 with the amount of displacement in the ordinate in the data processing•control device 20.

Figure 4A:
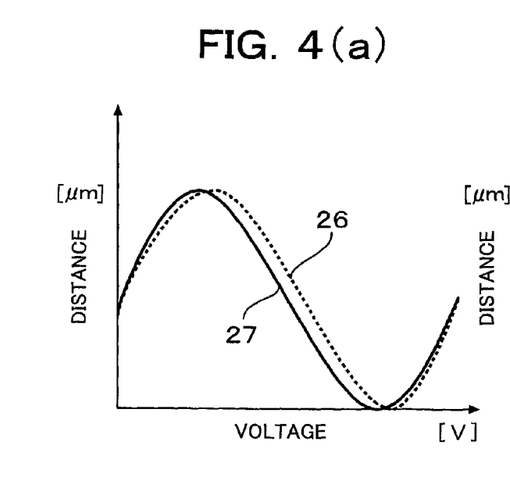
FIG. 4(a) shows a waveform of position detection signal and a head drive waveform for driving a piezo actuator and FIG. 4(b) shows hysteresis characteristics of the piezo actuator.

On the other hand, the drive waveform of the piezo actuator 6*a* becomes similar to a sine waveform shown in FIG. 4(*a*) since it has hysteresis characteristics. FIG. 3(*b*) shows the piezo drive waveform having a period of one rotation of a disk as that of the position detection signal 26 and the amount of extension and contraction of the piezo actuator 6*a* which is close to the displacement amount. As shown, the piezo drive waveform is closer to the position detection signal 26.

Figure 4B:
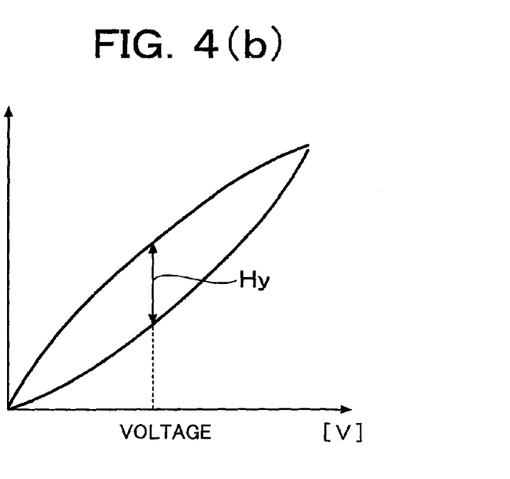

From the drive waveform of one shuttle of the hysteresis loop Hy of the piezo actuator 6*a* shown in FIG. 4(*b*), a piezo drive waveform 27 is selected as having the maximum extension and the maximum contraction with the center of extension and contraction of the piezo actuator 6*a* when the latter is driven as a reference which coincides with the maximum value of displacement (maximum amount of positional slip of the head 9) from the positioning track shown by the position detection signal 26 shown in FIG. 3(*a*). Then, the piezo drive waveform 27 is overlapped on the position detection signal 26 shown by dotted line in FIG. 4(*a*).

It is clear that the piezo drive waveform 27 is substantially the same as the position detection signal 26. The difference between the piezo drive waveform 27 and the position detection signal 26 is small.

Incidentally, the maximum amount of displacement (maximum value of position slip of the head 9) corresponds to the amplitude of the position detection signal 26 as shown in FIG. 3(*a*).

In FIGS. 4(*a*) and 4(*b*), the ordinate is the distance [μm] and the abscissa is the voltage [V]. The ordinate in FIG. 4(*a*) is the amount of displacement of the head 9 and the ordinate in FIG. 4(*b*) is the extension and contraction of the piezo actuator 6*a*.

When one rotation of the track is made correspondent to one hysteresis loop Hy of the piezo actuator 6*a* and the head 9 is driven by a waveform similar to a sine wave along the one hysteresis loop Hy, it becomes possible to make the extension of the piezo actuator 6*a* correspond to the amount of positional slip of head position in an arbitrary track position.

Further, when the voltage is increased in the hysteresis loop Hy, the head 9 is moved forward and accesses a track front of the aimed track. On the other hand, in the position detection signal 26, the voltage of the position detection signal 26 is increased as shown in FIG. 2 when the head 9 is retreated from the aimed track. That is, the head 9 is moved in opposite directions mutually. A similar movement in opposite directions occurs when the head 9 is retreated with respect to the aimed track.

Therefore, in order to trace the head 9 to the positioning track with respect to the track eccentricity, it is enough to move the piezo actuator 6*a* forward by increasing the drive signal when the voltage of the position detection signal 26 is increased. When the head 9 is moved forward from the positioning track, it is enough to lower the drive signal of the piezo actuator 6*a* according to the voltage of the position detection signal 26 which is lowered.

It is assumed that the amount of extension and contraction of the piezo actuator 6*a* with the center of extraction and contraction as the reference by the piezo drive waveform 27 corresponds to the amount of positional slip (amount of displacement) from the aimed track of the head 9 and the piezo drive waveform 27 is shown in FIG. 3(*b*) below the waveform of the position detection signal 26 shown in FIG. 3(*a*).

When the piezo actuator 6*a* is driven by the piezo drive waveform 27 in order to cancel the positional slip amount from the positioned aimed track of the head 9 from the original point of the hysteresis loop Hy, there is a slip θ of the phase of waveform in FIGS. 3(*a*) and 3(*b*). Therefore, it is necessary to set the phases of the piezo drive waveform 27 to the position detection signal 26.

When the phase of the piezo drive waveform 27 is set the phase of the position detection signal 26, the positions of the maximum peaks become coincident. However, the start point of drive by the drive signal of the piezo drive waveform 27 has to use the index signal IND (read start signal) as a reference. Therefore, rotation angle α of an initial maximum peak position of the position detection signal 26 and the index signal IND is obtained and the drive start position of the piezo drive waveform 27 is obtained by the rotation angle α.

The waveform of the piezo drive signal 28 shown by dotted line in FIG. 3(*b*) is a drive signal having the piezo drive waveform phase of which is set to the position detection signal 26. The drive start voltage value Vs of the piezo drive signal 28 preceding the rotation angle α from the initial maximum peak position of the piezo drive signal 28 is obtained. As a result, it is possible to obtain a drive start position of the piezo actuator 6*a* in the piezo drive signal 28 corresponding to the generation timing of the index signal IND (read start signal).

The reason for obtaining the rotation angle α up to the maximum peak position is that the maximum peak position corresponds to the position at which the displacement becomes maximum and the rotation angle α (refer to FIG. 3(*a*)) from the index signal IND to the initial maximum peak position is constant as described for FIG. 5 when the head 9 is positioned in any position of the track.

As a result, the data processing•control device 20 in the magnetic head/magnetic disk test device 10 performs the head drive control for following the head 9 to the eccentricity of the track.

Now, the head drive control for following the head 9 to the eccentricity of the track will be described.

Returning to FIG. 1, the data processing•control device 20 is constructed with a MPU 21, a memory 22, an interface 23, a CRT display 24 and a keyboard, etc., which are mutually connected through a bus 25. In the memory 22, a head access program 22*a*, a DC erase program 22*b*, a position detection signal gathering program 22*c*, DFT (discrete Furor Transform) analysis program 22*d* of amplitude•rotation angle, an optimum drive waveform search program 22*e*, an eccentric following head drive program 22*f* and a magnetic head/magnetic disk test program 22*g*, etc., are stored and a piezo drive waveform storing table 22*h* and a work region 22*i* are provided.

Figure 6:
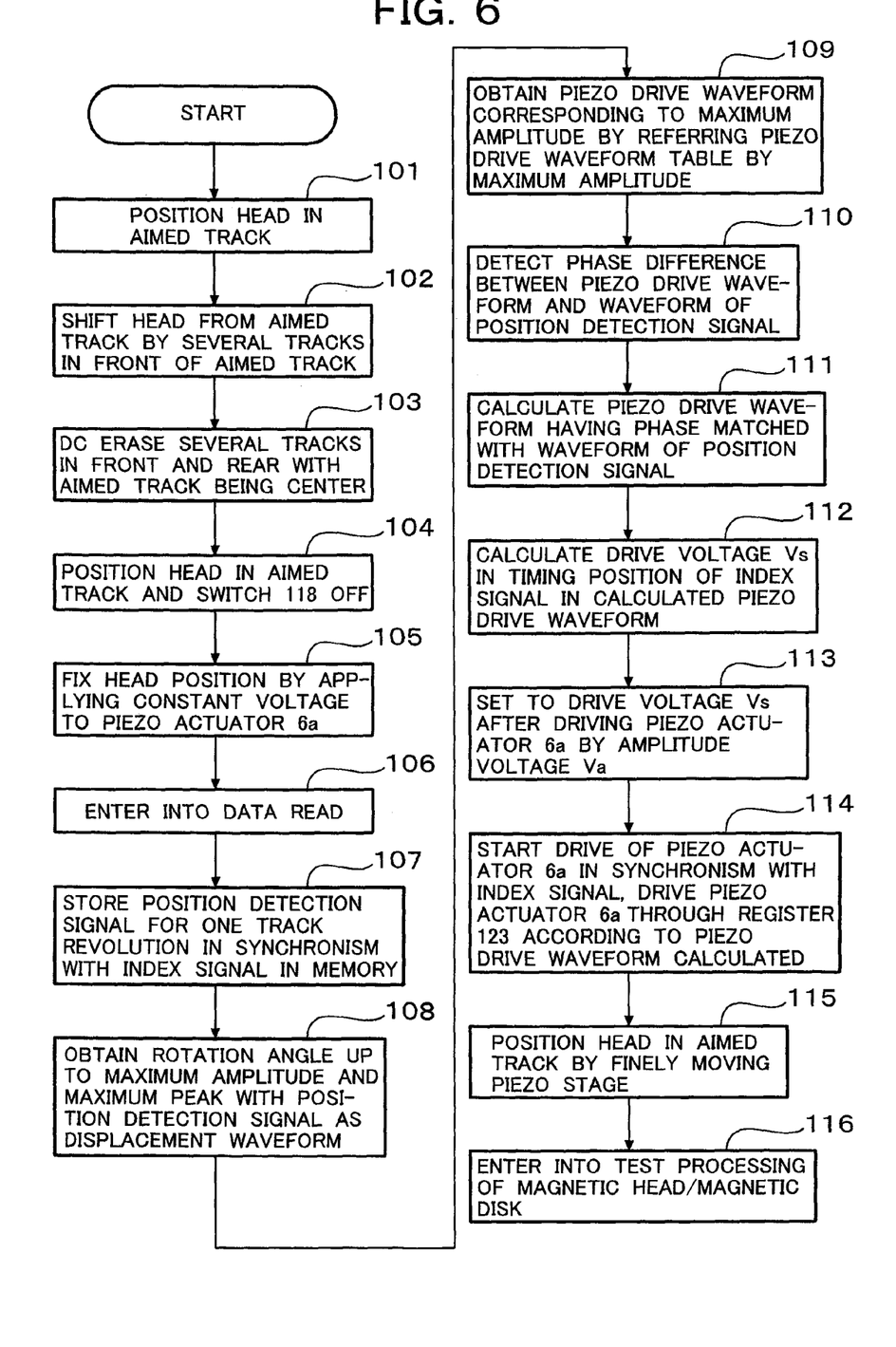
FIG. 6 is a flowchart of the head positioning control with respect to eccentric track.

The head positioning control of the magnetic head/magnetic disk test device for testing the magnetic head/magnetic disk by tracing the head 9 to eccentricity of the track and positioning the head 9 in the aimed track will be described with reference to a flow chart shown in FIG. 6.

The MPU 21 executes the head access program 22a to set a moving distance r mm in R direction in a predetermined resistor of the head access control circuit 15 and starts the head access control circuit 15 through the interface 23. By setting the moving distance r mm in R direction in the register, the X stage of the rough stage 4 is driven by the head access control circuit 15 to roughly move from a reference point or a designated track position by r mm and further the piezo stage 5 is driven to finely move the head 9 toward the distance r, read the track number and position the head in the aimed track (Step 101).

The moving distance −K μm in R direction is set in a predetermined register of the head access control circuit 15 through the interface 23. By setting the moving distance −K μm in R direction, the piezo stage 5 is driven by the head access control circuit 15, the head 9 is shifted to a position which is in front of the aimed track by K μm which corresponds to several tracks (Step 102).

Then, the MPU 21 executes the DC erase program 22b to DC erase a region covering an eccentricity for several tracks with a center of the aimed track from a front and a rear of the several tracks (Step 103).

The DC erasure is performed by writing data "0" in the whole (respective tracks and areas between tracks) covering the eccentric region of the tracks by, for example, a permanent magnet. Therefore, the region of the magnetic film in the servo area is magnetized by, for example, S pole.

Incidentally, the DC erasure may be performed by writing data "1" in the whole covering the eccentric region of the tracks. In such case, the region of the magnetic film in the servo area is magnetized by, for example, N pole.

Then, the MPU 21 reads the tack number, positions the head in the aimed tack and turns the switching circuit 118 OFF (Step 104).

The position of the head driven by the piezo actuator 6a is fixed by applying a designated constant voltage to the piezo actuator 6a (Step 105).

Then, the MPU 21 executes the position detection signal gathering program 22c to enter the data read stage by the MR head (read head) (Step 106).

The MPU 21 waits for the index signal IND (or start sector signal for one revolution). When the MPU 21 receives the index signal IND (or the start sector signal for one revolution), the MPU 21 starts an A/D conversion in synchronism with the index signal IND and stores the digital value of the position detection signal for one track revolution until a next index signal IND (or the start sector signal for one revolution) in the work region 22i of the memory 22 is generated (Step 107).

The slip amount indicated by the position detection signal for one track revolution in a front and rear track positions including the aimed track, which are gathered, is converted to the amount of displacement and the position detection signal is calculated as the position detection signal 26 shown in FIG. 3(a). That is, the ordinate in FIG. 3(a) is the amount of displacement and corresponds to the distance in radial direction. The abscissa is the revolution angle which corresponds to the head scan time of the track. Therefore, the position detection signal 26 is calculated by the position detection signal gathered in the distance in radial direction and the head scan time.

Then, the MPU 21 executes the DFT analysis program 22d of amplitude and revolution angle and obtains the following equations (1) and (2) from the position detection signal 26 to thereby obtain the maximum amplitude value X1 of the amount of position displacement (the amount of positional slip with respect to the track) and the revolution angle α from the index signal IND to the initial maximum peak position (Step 108).

$$\text{Position displacement waveform:} X = X0 + X1 \cdot \sin(2\pi f - \theta) \quad (1)$$

$$\text{Revolution angle } \alpha \text{ from the index signal IND to the initial maximum peak position} \quad (2)$$

where X0 is an offset amount for the reference level in the DFT processing, $X1 \cdot \sin(2\pi f - \theta)$ is a primary item value of the position slip, X1 is the maximum amplitude value thereof and $2\pi f$ is the revolution angle (radian).

Incidentally, though there are high items and values equal to or more than the secondary item and values, only the primary item value is used in this description as the correction value. In a case where high precision is required, it is possible to add higher items as parameters.

From the equation (1), the maximum amplitude value X1 and the revolution angle α are obtained and the piezo drive waveform (the equation (3) below) corresponding to the maximum amplitude value X1 is obtained by referencing to the piezo drive waveform storing table 22h shown in FIG. 1 (Step 109).

$$V = Va \cdot \sin(2\pi f) + Vb \cdot \sin(2\pi f - \theta a) \quad (3)$$

where $Va \cdot \sin(2\pi f)$ is a drive function corresponding to the drive signal of the piezo drive waveform 27 shown by a solid line in FIG. 4(a) and $Vb \cdot \sin(2\pi f - \theta a)$ is a function for correcting the difference between the position detection signal 26 shown by a dotted line in FIG. 4(a) and the drive signal of the piezo drive waveform 27.

Incidentally, the piezo drive waveform table 22h (refer to FIG. 1) stores a number of drive signals of the piezo actuator 6a as a number of the extension and contraction data of the piezo actuator 6a corresponding to a number of track eccentricity amounts. In concrete, the piezo drive waveform table 22h stores a number of drive signals of the piezo actuator 6a which generates maximum extension and contraction amounts corresponding to the maximum position slip amount of the head 9 from eccentric tracks corresponding to a number of track eccentricity amounts. In the equation (1), the maximum position slip amount corresponds to the maximum amplitude X1. Therefore, the piezo drive waveform table 22h stores the drive signals of the piezo drive waveform 27 having amplitudes of the voltage values Va and Vb shown by the equation (3) using the maximum amplitude X1 as the searching items. As to the voltages Va and Vb having different values, these are stored in the piezo drive waveform table 22h using the equation (3) correspondingly to the maximum amplitudes X1.

Incidentally, the piezo drive waveform table 22h stores respective data values of the table which are the data values of the equation (3) obtained by selecting the hysteresis loop Hy of extraction and contraction amount corresponding to the maximum amplitude X1 and voltage-driving the piezo actuator 6a.

Then, the phase difference θ between the function of the piezo drive waveform in the equation (3) and the function of the position detection signal in the equation (1) is detected (Step 110).

Then, a function of the piezo drive signal 28 (refer to FIG. 3(b)) in the equation (4), which is obtained by slipping the phase of the piezo drive waveform in the equation (3) by θ to match the phase of the piezo drive waveform with the func tion of the position detection signal in the equation (1), is calculated (Step 111).

$$V = Va \cdot \sin(2\pi f - \theta) + Vb \cdot \sin(2\pi f - \theta a - \theta) \qquad (4)$$

Then, the MPU 21 calculates the drive start voltage Vs in the timing position of the index signal IND in the equation (4) from the revolution angle α calculated by the equation (2) (Step 112). After the piezo actuator 6a is driven by the amplitude voltage Va (after one reciprocal drive of the hysteresis loop Hy), the drive start voltage of the piezo actuator 6a is set to Vs (Step 113).

Incidentally, from the equation (4), when the piezo drive signal 28 has a waveform starting the positive peak side to the negative peak side as shown in FIG. 3(a), the piezo actuator 6a is extended and contracted in the correction direction for the eccentric track. Therefore, the drive start voltage value Vs is selected in the lower passage of the hysteresis loop Hy shown in FIG. 4(b).

From the equation (4), when the piezo drive signal 28 has a waveform starting the negative peak side to the positive peak side, the piezo actuator 6a is contracted and extended in the correction direction for the eccentric track. Therefore, the drive start voltage value Vs is selected in the upper passage of the hysteresis loop Hy shown in FIG. 4(b).

Thus, when the timing of the index signal IND occurs in the state where the head 9 is positioned in the aimed track, the head 9 is ON tracked without positioning in the aimed track which is theoretically eccentric.

Therefore, in the state where the switching circuit 118 is in OFF state as set in Step 104, the MPU 21 performs a vibration drive to dynamically move the head 9 forward and backward in the radial direction repeatedly by the piezo drive signal 28 by waiting for the index signal IND and inputting digital values forming the piezo drive signal 28 of the equation (4) to the register 123 sequentially in synchronism with the index signal IND (Step 114). The moving range of the head 9 due to the vibration driving corresponds to the eccentric range of the track. The track number is read by finely moving the piezo stage 5 and positioning the head 9 in the aimed track (Step 115).

The movement of the head 9 in this positioning state may be done by inputting the moving data to the register 121 by the MPU 21 or moving the piezo stage 5 through the head access control circuit 15.

The positioning of the head 9 in the aimed track in Step 115 is performed in the vibration in Step 114. Since the head 9 can trace the track correspondingly to the displacement of the eccentric track by this vibration in Step 114, it is possible to position the aimed track easily by the positioning of the piezo stage 5 in Step 115. Thereafter, the head 9 traces the eccentricity of the aimed track which revolves eccentrically by the vibration in Step 114 and positioned.

In this case, the ON track control after the head positioning may not be done. However, the more finely positioning becomes possible by turning the switching circuit 118 ON after the head 9 is positioned in the aimed position in Step 115 and performs the ON track control by reading the servo information.

In such state, the test processing of the magnetic head/magnetic disk is performed (Step 116).

In the testing of the magnetic head, the test data is written in the aimed track and the reading of the test data is performed. In the case of the testing of the magnetic disk, there is a case where the correction drive waveforms of the inside track and the outside track are different. Therefore, the tracks of the DTM 1 are divided to regions each including several tens to several hundreds tracks and an optimum piezo drive waveform are obtained for each region from the piezo drive waveform recording table 22h and it is preferable that the test is performed by positioning in each track within each region including several tens to several hundreds tracks by the piezo driver function (piezo drive signal 28) in the equation (4) corresponding thereto.

In the position detection signal 26 having normalized POS voltage shown in FIG. 2, the voltage when the head moves forward with respect to a track becomes − side and, when the head moves backward, it becomes + side. When these become inverted, the phase of the drive signal of the piezo drive waveform 27 is different from the phase of the position detection signal by 180°. That is, the phase difference θ between the position detection signal 26 shown in FIG. 3(a) and the drive signal of the piezo drive signal of the piezo drive waveform 27 shown in FIG. 3(b) becomes 180°+θ and the piezo drive signal 28 is obtained.

In such case, since the waveforms of the position detection signal 26 and the piezo drive waveform 27 are similar to sine waveforms, it becomes possible to drive the head by inverting the voltage of the drive signal of the piezo drive waveform 27 without using the phase difference of 180°.

Incidentally, the corrective drive for the track eccentricity due to the piezo actuator 6a can be done by detecting waveform having negative side peak after the positive side peak in the position detection signal 26 or inversion thereof, without performing the phase coincidence of the drive signals of the position detection signal 26 and the piezo drive waveform 27 due to the phase difference θ or 180°+θ. The reason for this is that it is possible by the detection of the order of the peak to determine which is front or rear in the piezo drive signal 28. It is possible to obtain the drive start voltage Vs before the revolution angle α in the detected peak.

In the embodiment, only the servo voltage demodulation•position voltage calculation circuit 120 is constructed with the DSP. However, among the servo positioning control circuit 11, a portion or all other than the piezo drivers 114 and 117 can be constructed with a digital calculation circuit such as DPS, etc.

As described, in this embodiment, the reading is started in synchronism with the index signal IND as the read start signal and the position detection signal waveform is obtained. However, the reference of one revolution can be a sector signal. In this invention, it is possible to use the read start signal other than the sector signal so long as the read start signal can become the reference of one revolution.

Further, though the hysteresis characteristics of the piezo actuator is used as an example in this embodiment, this invention can be applied by using other actuator with which the waveform similar to sine waveform.

The invention claimed is:

1. A head positioning method for an eccentric track in a head positioning device including a disk which has servo information corresponding to a number of tracks, a rough moving stage, a fine moving stage mounted on the rough moving stage, a composite magnetic head mounted on the fine moving stage and an actuator for moving the composite magnetic head in a radial direction of the disk at high speed in order to position the composite magnetic head in a predetermined eccentrically rotating track, comprising the steps of positioning the composite magnetic head in the predetermined track by moving the fine moving stage with the movement of the composite magnetic head being fixed, generating a position detection signal of the composite magnetic head for one track revolution corresponding to a position slip of the composite magnetic head from the predetermined track which rotates eccentrically by a read signal of the servo information from the composite head corresponding to the predetermined read start signal, detecting an amplitude of the position detection signal for one track revolution and a rotation angle from the position of the predetermined read start signal to the maximum peak position, obtaining an actuator drive signal having maximum extension and contraction amount corresponding to the maximum position slip amount indicated by the amplitude of the position detection signal from a memory which stores a number of drive signal waveforms of the actuator to extend or contract the actuator corresponding to amounts of the eccentricity of a track in one revolution of the disk, wherein the composite magnetic head is positioned in the predetermined track by driving the actuator by the actuator drive signal obtained correspondingly to the predetermined read start signal with the position corresponding to the generating timing of the predetermined read start signal which is determined by the rotation angle as a reference or a signal having a waveform which is an inversion of the waveform of the actuator drive signal, and wherein the memory has a storing table which stores a number of the actuator drive signals for generating the maximum extension and contraction amount of the actuator corresponding to the maximum position slip amount with respect to the maximum position slip amount of the composite magnetic head from the eccentric tracks corresponding to the number of track eccentricity amount; and driving the actuator by the actuator drive signal or the signal having a waveform which is an inversion of the actuator drive signal and the step of obtaining the position corresponding to the generation timing of the predetermined read start signal as a drive start voltage value determined by the rotation angle, wherein the step of detecting the amplitude and the rotation angle is to detect an angle from the position of the predetermined read start signal to the maximum peak position as the rotation angle.

2. A head positioning method for an eccentric track claimed in claim 1, comprising the step of matching the phase of the actuator drive signal with the phase of the position detection signal or a phase which is different from the actuator drive signal by 180 degrees, wherein the step of driving the actuator is to obtain the drive start voltage value from the actuator drive signal obtained by the phase matching.

3. A head positioning method for an eccentric track claimed in claim 2, wherein the phase matching step is to match the actuator drive signal and the position detection signal by detecting a phase difference between the waveforms of the actuator drive signal and the position detection signal, the maximum extension and contraction amount of the actuator corresponds to a maximum extension amount and a maximum contraction amount with a center of the extension and contraction of the actuator as a reference, and the actuator drive step is to start the drive of the actuator from the drive start voltage value and to drive the actuator by the actuator drive signal such that the maximum position slip amount and the maximum extension and contraction amounts from the predetermined track indicated by the position detection signal are matched.

4. A head positioning method for an eccentric track claimed in claim 3, wherein the actuator is a piezo actuator and the actuator drive step is to repeatedly add the actuator drive signal to the piezo actuator.

5. A head positioning method for an eccentric track claimed in claim 4, wherein the predetermined read start signal is an index signal or a sector signal, the step of positioning the composite magnetic head in the predetermined track is to fix the movement of the composite magnetic head by the actuator in a position in which a forward and backward movement covering the eccentricity of the track is possible.

6. A head positioning method for an eccentric track claimed in claim 5, comprising the step of positioning the composite magnetic track in the predetermined track by ON track servo control for the composite magnetic head, wherein the ON track servo control is performed by reading the servo information of the predetermined track and driving the piezo actuator according to the servo information.

7. A head positioning method for an eccentric track claimed in claim 6, comprising a servo positioning control circuit, wherein the servo positioning control circuit perform the ON track servo control and generates the position detection signal, wherein the positioning of the composite magnetic head in the predetermined track is performed by making the ON track servo control in the servo positioning control circuit useless.

8. A head positioning method for an eccentric track claimed in claim 7, wherein the actuator drive step includes the step of driving the composite magnetic head with exciting the composite magnetic head to dynamically move the composite magnetic head back and forth in the radial direction of the disk, wherein the drive of the actuator is started by the drive start voltage in synchronism with the predetermined read start signal to position the composite magnetic head in the predetermined track by repeatedly adding the actuator drive signal to the piezo actuator and, in the driving state in which the composite magnetic head vibrates in the radial direction of the disk by this exciting drive step, the composite magnetic head is positioned in the predetermined track under the ON track servo control by the servo positioning control circuit after the composite magnetic head is positioned in the predetermined track.

9. A head positioning device including a rotatable disk having a number of tracks and servo information set in the respective tracks, a rough moving stage, a fine moving stage mounted on the rough moving stage, a composite magnetic head mounted on the fine moving stage and an actuator for moving at high speed the composite magnetic head in a radial direction of the disk for positioning the composite magnetic head in a predetermined track rotating eccentrically, comprising head positioning means for positioning the composite magnetic head in a predetermined track by moving the fine moving stage with a movement of the composite magnetic head by the actuator being fixed, a position detection signal generating circuit for generating the position detection signal of the composite magnetic head for one track revolution corresponding to the position slip of the composite magnetic head from the designated rotating eccentric track by receiving a read signal of the servo information from the composite head corresponding to a designated read start signal, amplitude rotation angle detection means for detecting the amplitude of the position detection signal for one track revolution generated by the position detection signal generation circuit and the rotation angle of the position detection signal from the predetermined position start signal to the maximum peak position of the position detection signal, a memory for storing data of drive signal waveforms of the actuator to extend or contract the actuator corresponding to an amount of eccentricity of a track in one revolution of the disk, wherein the composite magnetic head is positioned in the designated track such that the composite magnetic head traces in the eccentric direction of the designated track by obtaining the actuator drive signal having maximum extension and contraction corresponding to the maximum position slip amount indicated by the amplitude of the position detection signal and driving the actuator by the actuator drive signal obtained correspondingly to the generation of the designated read start signal or a signal having a waveform which is an inversion of the waveform of the actuator drive signal, and wherein the memory has a storing table which stores a number of drive signal waveforms of the actuator, which have waveforms similar to a sine waveform, for generating respective maximum extension and contraction amounts of the actuator corresponding to respective maximum position slip amounts of the composite magnetic head from eccentric tracks corresponding to eccentricity amounts; and actuator drive means, wherein the actuator drive means drives the actuator by the actuator drive signal or the signal having a waveform obtained by inverting the waveform of the drive signal and obtains a position corresponding to the generation timing of the predetermined read start signal as a drive start voltage determined by the rotation angle, and the amplitude rotation angle detection means detects an angle from the position of the predetermined read start signal to the maximum peak position.

10. A head positioning device claimed in claim 9, comprising phase matching means, wherein the phase matching means obtains the drive start voltage from the obtained actuator drive signal, the position matching of which is performed by the phase matching means.

11. A head positioning device claimed in claim 10, wherein the phase matching means detects a phase difference between the waveforms of the obtained actuator drive signal and the position detection signal to match the phases of these signals, the actuator drive means starts the driving of the actuator from the drive start voltage and drives the actuator by the obtained actuator in such a way that the maximum position slip amount and the maximum extension and contraction amount from the predetermined track indicated by the position detection signal are coincident.

12. A head positioning device claimed in claim 11, wherein the actuator is a piezo actuator and the actuator drive means repeatedly adds the obtained actuator drive signal to the piezo actuator.

13. A head positioning device claimed in claim 10, comprising a data processing control device having a processor and the memory and the amplitude rotation angle detecting means, the phase matching means and the head positioning means execute programs stored in the memory.

\* \* \* \* \*